United States Patent Office 3,436,572
Patented Apr. 1, 1969

3,436,572
ROTATIONAL ENERGY ACCUMULATOR, ESPECIALLY FOR ELECTRICALLY DRIVEN VEHICLES
Bjarne Storsand, Watt, Switzerland, assignor to Maschinenfabrik Oerlikon, Zurich, Switzerland
Filed Sept. 8, 1966, Ser. No. 578,066
Claims priority, application Switzerland, Sept. 16, 1965, 12,880/65
Int. Cl. H02k 7/02, 47/18, 47/30
U.S. Cl. 310—74                                    12 Claims

ABSTRACT OF THE DISCLOSURE

A rotational energy accumulator unit for powering electric drives for vehicles includes a gas-tight casing, a flywheel mounted within said casing, and antifriction bearings rotatably supporting said flywheel for rotation about a horizontal axis at speeds of from 6000 to 12000 r.p.m. Winding-free rotors of homopolar-synchronous machines are rotatable with the flywheel, the machines being located within the sealed casing and one rotor being fixed to each of a pair of stub shafts of the flywheel. These machines operate as motors, during stops of the vehicle, to accelerate the flywheel, and operate as generators, during running of the vehicle, to provide the electric power for driving the vehicle. Means are provided to control precession of the accumulator unit. The casing is preferably spherical and mounted in a mating hemispherical mounting.

---

This invention relates to energy accumulators and, more particularly, to a novel rotational energy accumulator in which the accumulated rotational energy can be converted efficiently into electrical energy to supply power for an electrically driven vehicle or the like.

Swiss Patent No. 242,086 describes a system for electrical driving of vehicles without the use of overhead power supply lines, such as trolley wires. This method uses the energy stored in a flywheel that is mounted in the vehicle for rotation about a vertical axis. The flywheel is accelerated during vehicle stops by supplying energy from a power supply to an electrical machine connected to the flywheel and operating either as a motor or a generator. In accelerating the flywheel, the electrical machine operates as a generator and, during movement of the vehicle, the electric machine is driven by the flywheel to operate as a generator supplying power to the vehicle motor or motors.

The flywheel, depending on the size of the vehicle, has a weight of 200–2000 kg., and runs with the electric machine in a common, gas-tight case in a vacuum, or in a light gas, such as H$_2$ or He, at a sub-atmospheric pressure. The unit is journaled in high grade anti-friction bearings, so that frictional losses are kept to a minimum. For the high speeds of the unit, which are in the range of 3000–12,000 r.p.m. only special ball bearings can be used to absorb the axial pressure of the rotor.

The vertical orientation of the axis of the flywheel mass has a number of advantages important for the construction as well as for the operation of the vehicle. In particular, such vertical orientation of the flywheel axis is important for radial movability of the vehicle, as, during turning or radial driving of the vehicle, there do not occur any gyroscopic moments which would impede maneuverability of the vehicle and excessively strain the bearing of the accumulator unit.

For normal operating conditions, it is sufficient to mount the unit to be movable in the vehicle in such a way that inclined positions of about 1:10 of the vehicle, occurring during operation thereof, can be absorbed without any substantial additional forces. With public vehicles, such as city buses, the flywheel or flywheels can, when arranged for rotation about a vertical axis, be mounted beneath the vehicle so as to save space.

A large number of such vehicles have been used in the most diversified operations. For example, the driving unit has been used in buses, shuting or switching tractors, and mine locomotives. These uses have amply proved the practicality of the system.

However, it has not been possible to provide electrically driven vehicles of this type which, from the economic point of view, can compete with conventional vehicles, such as electric vehicles supplied from overhead lines or vehicles driven by thermal motors, such as internal combustion engines. In particular, the equipment necessary for specifically required accumulator outputs has been too heavy and thus also too expensive, and the output has been too small while the energy consumption has been too high. Furthermore, it has not been possible to mount the flywheel in such a way as to attain a desirably long service life of the bearings. In view of the decisive importance of a completely safe bearing arrangement for the accumulator unit, it is clear that only a drastic improvement can help clear the way for the system to gain general acceptance.

Although rotary energy accumulators including flywheels rotatable about horizontal axes are known, these accumulators have comprised three-phase, shortcircuit-armature machines. These have a storage output that is much too low to be able to build vehicles which can compete economically with conventional means of transportation.

An object of the present invention is to provide a flywheel arrangement for the mentioned system and for storing rotational energy, particularly for operation of vehicles, and having a high storage capability combined with a favorable weight, small dimensions and high efficiency.

A further object of the invention is to provide such a flywheel arrangement which assures the greatest safety and a long service life of the flywheel bearings.

A further object of the invention is to provide such a flywheel as just mentioned combined in an accumulator unit to operate with an electric machine in a gastight casing at sub-atmospheric pressure.

Yet another object of the invention is to provide such an accumulator unit in which the flywheel and the rotor of the electric machine rotate about a common horizontal axis, with the supporing axle being journaled in antifriction bearings with minimal losses.

A further object of the invention is to provide an accumulator unit of the type just mentioned operating at maximum speeds in the range of preferably between 6000 and 12,000 r.p.m.

Still another object of the invention is to provide an accumulator unit of the type mentioned in which, especially when it is used in vehicles, the unit is pivotable about a vertical axis.

A further object of the invention is to provide an accumulator unit of the type mentioned in which the horizontally oriented axle is journaled elastically from a lateral standpoint to permit relative movements of about ±10% with respect to the vertical axis.

In accordance with the invention, the accumulator unit is arranged symmetrically with respect to the central diametric plane of the flywheel so that both bearings are loaded to an equal degree. Two electric machines are used, one on each side of the flywheel, and this facilitates cooling of the machines when operating in a vacuum. The machines are constructed as homopolar synchronous machines with stationary excitation windings but without any rotor windings. Thereby, the motors can be fed, as set forth in Swiss Patent No. 244,759, from a direct current source through a valve type inverter, and energy can be supplied to the motors through rectifiers.

These rotors are arranged on the stub shafts of the flywheel, on respective opposite sides of the flywheel, and the exciter windings, as well as the stators having the stator windings of the machines, are mounted within the casing. The rated speeds of these machines are from 6000 to 12,000 r.p.m.

Particular advantages of the invention unit include a high storage capacity with the favorable weight, small dimensions, high efficiency and long service life of the bearing supports of the flywheel.

The invention arrangement also provides for recovery of energy during brakings or on downgrades, as set forth in Swiss Patent No. 242,086. Means are provided to prevent magnetic leakage of the exciter magnets through the bearing parts and to the flywheel, such as, for example magnetic shields, parts of high magnetic resistance, magnetic shunts and flux deflection coils, and the casing is made of non-magnetic material.

The overall length of the supporting axle preferably is made equal to or less than the diameter of the flywheel, so that the geometric definition of the unit, when in operation, comprises an imaginary spherical shell of the same diameter as the casing of the flywheel. The casing of the unit can have a spherical form, which combines high strength with a minimum weight. In one embodiment of the invention, the spherically encased unit is arranged pivotable in a semi-spherical shell mounted in the vehicle, with friction preventing elements being disposed between the casing of the unit and the shell.

The flywheel, and the two lateral shaft journals extending laterally therefrom, are forged in one piece, which provides a great many advantages for utiization of material, control of the material and working of the material, as well as providing advantages with respect to stability in operation and vibration-free running of the flywheel.

In accordance with another object of the invention, the flywheel, during centrifugal tests, is rotated at a speed providing stresses above the elastic limit of the flywheel material, for the purpose of obtaining a higher specific energy storage factor at a given maximum stress of the material.

For busses and mining and shunting locomotives, flywheel weights in the range of 500–2000 kg. are used. For these purposes, it is preferable to use flywheels of around 1,000 kg. and having outer diameters of 800–1,200 mm., these dimension being particularly suitable in order to accommodate the greater space requirements of the horizontally oriented flywheel axle design to the vehicle.

For an understanding of the principles of the invention, reference is made to the following description of typical embodiments thereof, as illustrated in the accompanying drawings.

Figure 4:
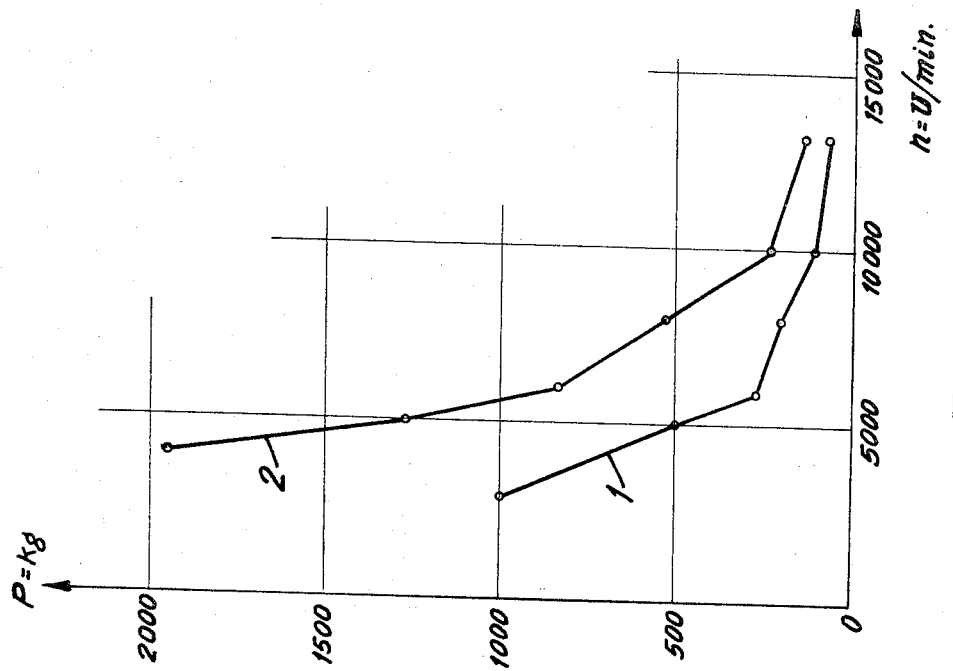
Figure 3:
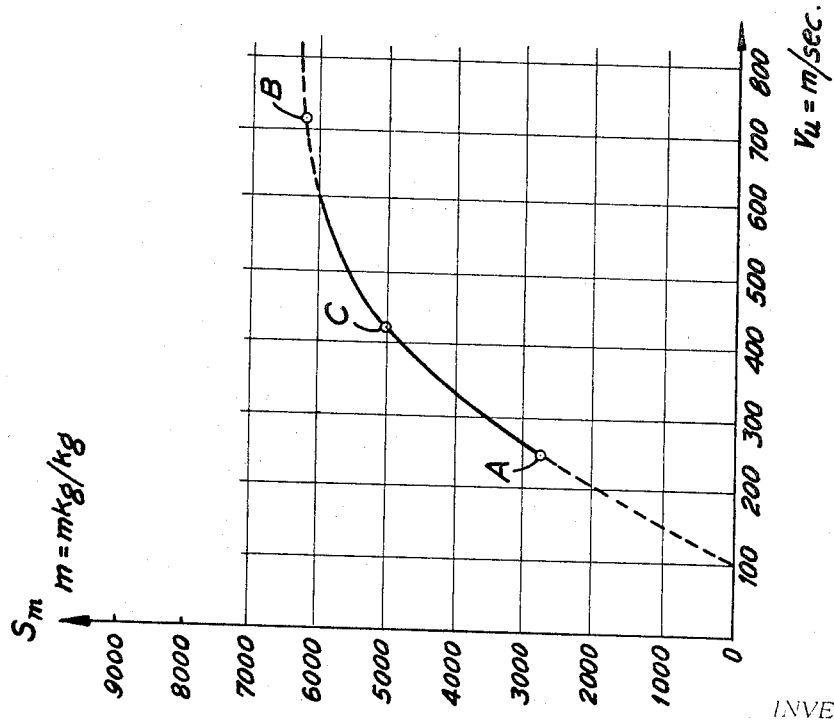

FIG. 3 graphically illustrates the relation between specific accumulating capability and the maximum admissible strain on a flywheel, for presently known steels; and FIG. 4 graphically illustrates the curves of the bearing capacity of anti-friction bearings as a function of speed.

Figure 1:
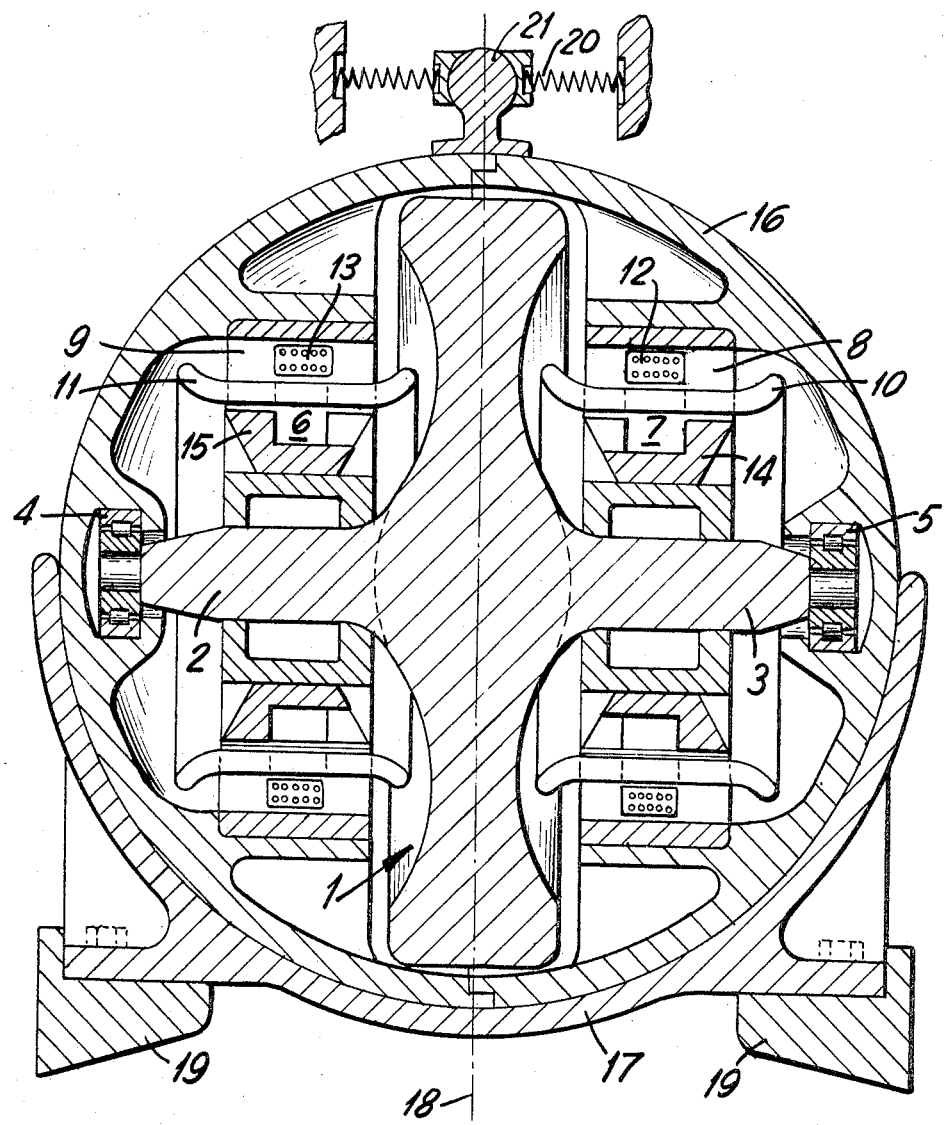
FIG. 1 is an axial sectional view of an accumulator unit embodying the invention, as arranged for mounting in a vehicle.

Referring to FIG. 1, a centrally disposed flywheel 1 is illustrated as having two shafts 2 and 3, one projecting from each side thereof and both shafts preferably being formed integral with flywheel 1. The horizontal shafts 2 and 3 are journaled in the anti-friction bearings 4 and 5. Two electric machines are provided, each mounted on a respective one of the shafts 2 and 3. In the illustrated embodiments, these machines 6 and 7 are shown as homopolar synchronous machines having stators 8 and 9 provided with working windings 10 and 11, respectively, and with fixed exciter windings 12 and 13, respectively. The rotors, which are illustrated at 14 and 15, are mounted on the flywheel stub shafts 2 and 3, respectively and do not carry any windings.

The forging of the flywheel and its stub shafts in one piece has advantages with respect to the utilization of the material, the machining, the stability in operation and a vibration-free running of the flywheel. For driving vehicles, flywheel weights of the order of 500–2000 kg., and preferably 1000 kg., with flywheel diameters between 800 and 1200 mm., are preferred.

A ball or spherically-shaped casing 16 encloses the accumulator unit comprising the flywheel 1 and the electric machines 6 and 7, and casing 16 is illustrated as universally movable in semi-spherical shell 17 which may be secured to the vehicle by suitable mounting or securing means 19. Shell 17 is made of a non-magnetic material, preferably an aluminum alloy. 18 represents the vertical axis about which the unit turns when the vehicle is rounding a curve, and which is laterally supported elastically in order to permit relative movements of about ±10% in relation to the vertical plane. This may be effected by means of a number of springs 20 distributed around a ball and socket joint 21. It should be noted that suitable anti-friction means may be disposed between casing 16 and 17.

Magnetic shields are provided to prevent magnetic leakage of the exciter portions through the bearing parts and to the flywheel. These magnetic shields may comprise, for example, parts of high magnetic resistance, magnetic shunts and flux deflection coils, mounted in the casing 16 and preferably on the stators of the synchronous electric machines. In the case of the deflection coils, the latter are preferably connected in series with the exciter windings, but with current flow therethrough in a direction opposite to the current flow through the exciter windings.

In order to properly evaluate the advantages attained with the above-described construction, relative to the increase in the accumulating capability of kinetic energy accumulators coupled with the simultaneous reduction of weight and space as well as with an increase of safety and service life of the bearings, it is necessary to explain briefly a few principles for the calculation or design of such accumulator units.

(a) The accumulating capability of a flywheel formed of a certain material depends, aside from its weight and shape, only on the circumferential speed $V_u$ in m./s. If an optimal flywheel, consisting of an inner disk of uniform strength and an outer rim, is used, there results, with a given admissible maximum strain on the flywheel material, $\sigma$ in kg./cm.², for an increasing circumferential speed, an increasing specific accumulating capability, S in mkg./kg., as a function of the circumferential or peripheral speed.

Figure 2A:
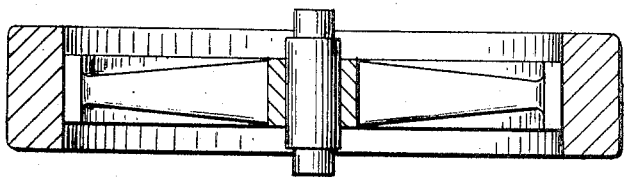
FIGS. 2a–2e are axial sectional views through various forms of flywheels which may be used with the invention accumulator.
Figure 2B:
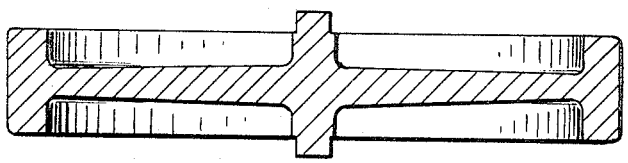
Figure 2C:
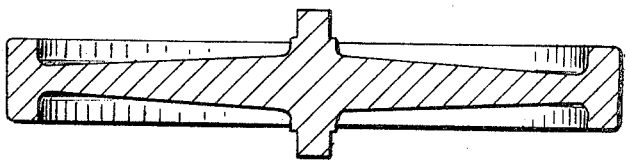
Figure 2D:
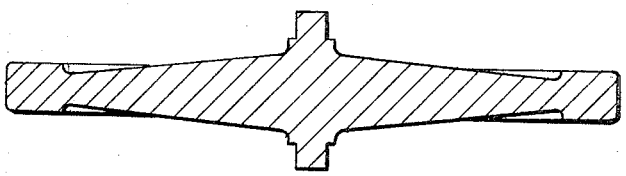
Figure 2E:
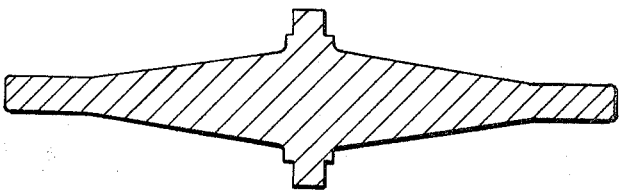

FIGS. 2a through 2e illustrate the cross-sectional shape of such wheels, progressing from a self-supporting ring in FIG. 2a to a uniform strength disk with a narrow rim, as shown in FIG. 2e, these flywheels having various circumferential or peripheral speeds at $\sigma=3000$ kg./cm.². Theoretical investigations show that the maximum achievable specific accumulating capacity, with a given specific weight, $\gamma$ kg./m.³, for an alloyed steel with $\gamma=7.835$ kg./m.³, amounts to $S_{max}=1.25\ \sigma$ mkg./kg. This accumulating capacity is attained at $$V_u = 10\sqrt{\sigma} \text{ m./sec.}$$

A further increase of the circumferential or peripheral speed beyond this figure entails no substantial increase of the specific accumulating capability.

FIG. 3 shows, as a result of a large number of graphic and mathematical calculations for different flywheel forms according to FIG. 2, the course of the specific accumulating capability S as a function of the circumferential speed ($V_u$) for a value $\sigma$ 5000 kg./cm.$^2$, permissible for present known steels. S is measured in m.-kg./kg. (= energy per kg.) and $V_u$ in m./sec. Very comprehensive and complicated investigations have shown that the storage capacity of a flywheel of a certain material, depends on the weight, the shape and the circumferential speed. The curve of the specific accumulating capability as a function of the circumferential or peripheral speeds extends from point A, which corresponds to the accumulating capability of the self-supporting ring $S_R$=0.68 mkg./kg. and with $$V_u = 3.5\sqrt{\sigma\text{m./s.}}$$

to point B, which corresponds to the substantially maximum achievable accumulating capability $S_{max}$, of a flywheel consisting of an inner disk whose strength is equal to that of an outer rim and formed of alloy steel. If the curve is extended downwards, it intersects the zero line at $$V_{min} = 1.4\sqrt{\sigma\text{m./s.}}$$

The specific accumulating capability, attainable for each value of $V_u$ can be obtained by inserting the values $S_{max}$, $V_{max}$ and $V_{min}$ in the foregoing equations, and can be accurately expressed by the formula $$S = S_{max} \cdot \left(1 - \left(\frac{V_{max} - V_u}{V_{max} - V_{min}}\right)^2\right) \text{kgm./kg.}$$

From this it can be seen that a range of $V_u$=400–600 m./s. is the most favorable for the design of kinetic energy accumulators, and this should be compared with the value of 150–300 m./sec. mentioned in the earlier Swiss Patent No. 242,086.

In accordance with the invention, the rotational energy accumulator is constructed of steel in which $\gamma$=7.835 kg./m.$^3$, for a value of $S=\sigma\pm20\%$ (S in $m$, $\sigma$ in kg./cm.$^2$). The higher value of S corresponds to higher circumferential speeds, and the lower values correspond to corresponding lower values of circumferential speed.

The electrical energy requirement at the driving motor terminals, in short distance operation of a bus having an optimally designed electric drive, for example, a drive in which starting is effected without any loss in starting resistances and with recuperative braking, is a maximum 100 wh./T.km.

For a city bus used in short distance transportation with frequent stops and having a total weight of 15T, 1.5 kwh./km. is thus required. If a stop for rapid charging of the flywheel accumulation is provided at every 5 kilometers, the rotational energy accumulator must be able to provide 7.5 kwh. during each discharge of its energy in the form of electric power. With a utilization of 86% of the maximally storable mechanical energy ($n$=100% to $n$=40% of the maximum speed), and an electrical efficiency of 87% inclusive of frictional losses, this results in a required maximal stored mechanical or rotational energy of 10 kwh. or 3.68·10$^6$ mkg. in order meet the particular conditions. If now the optimal value of $S=\sigma$ mkg./kg., i.e., in the present case $S$=5000 mgk./kg., is chosen, the result is a required active flywheel weight of $$G = \frac{3.68 \cdot 10^6}{5000} = 736 \text{ kg.}$$

and a speed of $V_u$=420 m./s., according to point C in the curve of FIG. 3. If about 250 kg. weight of the two electric machine rotors and the two shafts is assumed, it will be seen that, for the selection of the bearings, a flywheel weight of about 1000 kg. must be taken into consideration.

If, from the data of leading bearing manufacturers, bearings suitable for such a weight are selected, and have an assured service life of 20,000 hours (about 3 years), the result is that, for a unit with a vertical axis of rotation and an axial ball bearing as a journal bearing, the maximal speed of $n$=3000 r.p.m. can be chosen while, with a horizontal axis of rotation according to the invention, roller bearings withstanding a speed of $n$=8000 r.p.m. can be used.

FIG. 4 illustrates the bearing capacity of anti-friction bearings as a function of speed, with curve 1 relates to rotation about a vertical axis using ball bearings (for $P$=1000 kg. and $n$=3000 U/min.), and curve 2 relating to support of a horizontal axis of rotation involving roller bearings (for $P$=500 kg., due to the support on both sides of the flywheel, and $n$=800 U/min.). With $V_u$=420 m./s. and $n$=3000 r.p.m., there results, utilizing a mounting involving a vertical axis. a flywheel diameter of $$D = \frac{420}{\frac{3000\pi}{60}} = 2.67 \text{ m.}$$

On the other hand, with a horizontal axis and at 8000 r.p.m., there results a flywheel diameter of $$D = \frac{420}{\frac{8000\pi}{60}} = 1.00 \text{ m.}$$

If, for the vertical axis arrangement design, a bearing is chosen which would have to carry a 1,000 kg. axial load at 8000 r.p.m., the service life of such a bearing is only about 100 hours. This demonstrates the impossibility of a practical solution of this type.

Other designs of bearings, such as double cone roller bearings, are not suitable for use at this speed and at this loading since, first, very high losses would occur as compared with simple cylindrical roller bearings and, second, a very expensive lubrication and cooling system would be required, which is unsuitable for incorporation into a closed casing under a vacuum. The given example clearly shows the surprising reduction of the dimensions and weight and the improvement of the service life of the bearings, which can be achieved with the invention arrangement.

From the foregoing considerations, it will be clear that flywheels rotatable about horizontal axes, and in operative association with high speed homopolar synchronous machines, permit an extremely great reduction of the flywheel diameter. With the invention arrangement, it thus is possible, in particular, to provide an electric drive for transportation means or vehicles without using overhead wires, and achieving operational as well as economic results which are fully competitive with conventional electric drives deriving power from overhead lines, or with thermal motors such as internal combustion engines. In view of the ever-worsening air in cities due to the exhaust gases of the transportation means, a development of the type forming the subject matter of the present invention is of the greatest importance.

In order that the noise of the high speed machine does not inconvenience passengers, the unit is encased in a noise deafening jacket and the losses are, at the same time, dissipated by means of liquid cooling.

While specific embodiments of the invention have been shown and described in detail in order to illustrate the application of the principles of the invention, it will be understood that the invention may be embodied otherwise without departing from such principles.

What is claimed is:

1. In a rotational energy accumulator unit, particularly for powering electric drives for vehicles, of the type including a gas-tight casing, a flywheel mounted within the casing, and electric machine means within the casing and connected with said flywheel, the machine means, when connected to a source of electric potential, acting as driving motor means for the flywheel and, when driven by the accumulated rotational energy of the flywheel, generating electric power for driving the vehicle: the improvement in which said drive wheel is mounted for rotation about a substantially horizontal axis and includes a pair of oppositely projecting axially aligned stub shafts; roller bearing means rotatably supporting said stub shafts within said casing; and a pair of homopolar synchronous electric machines having rated speeds between 6000 and 12,000 r.p.m., within said casing; said homopolar synchronous electric machines including respective winding-free rotors each secured for rotation on a respective stub shaft of said flywheel; said homopolar synchronous machines including stators, exciter windings, and stator windings on said stators; mounted stationarily within said casing.

2. In a rotational energy accumulator unit, the improvement claimed in claim 1, including magnetic shields and magnetic deflectors within said casing and positioned to prevent leakage fluxes of said exciter winding of said electric machines away from the bearing portions of said machines and of said flywheel.

3. In a rotational energy accumulator unit, the improvement claimed in claim 1, in which said deflectors comprise compensating windings arranged in series with said exciter windings, but having an oppositely directed current flow relative to said exciter windings, positioned on said stators.

4. In a rotational energy accumulator unit, the improvement claimed in claim 1, in which said casing is made of an aluminum alloy.

5. In a rotational energy accumulator unit, the improvement claimed in claim 1, said flywheel and said shafts constituting a one-piece forging.

6. In a rotational energy accumulator unit, the improvement claimed in claim 1, including means mounting said accumulator unit for pivoting about a substantially vertical axis.

7. In a rotational energy accumulator unit, the improvement claimed in claim 1, in which said casing is made of non-magnetic material.

8. In a rotational energy accumulator unit, the improvement claimed in claim 1, including liquid cooling means dissipating the losses of said unit; and a noise-deafening jacket enclosing said casing.

9. In a rotational energy accumulator unit, the improvement claimed in claim 1, the distance between the outer ends of said shafts being not greater than the diameter of said flywheel; whereby the geometric definition of the unit while in operation comprises an imaginary spherical shell having a diameter equal to the flywheel diameter.

10. In a rotational energy accumulator unit, the improvement claimed in claim 1, wherein said casing is a spherical shell.

11. In a rotational energy accumulator unit, the improvement claimed in claim 10, in which said spherical shell is disposed in a semi-spherical shell fixedly positioned on the vehicle; said spherical shell being universally movable relative to said semi-spherical shell; and anti-friction means interposed between said spherical shell and said semi-spherical shell.

12. In a rotational energy accumulator unit, the improvement claimed in claim 11, including a ball and socket member having a ball secured to said spherical shell; and spring means interposed between the socket member and the vehicle.

References Cited

UNITED STATES PATENTS

| | | | |
|---|---|---|---|
| 674,825 | 5/1901 | Castro | 318—161 |
| 2,378,858 | 6/1945 | Mehan | 310—74 |
| 2,589,453 | 3/1952 | Storsand | 310—74 |
| 2,641,132 | 6/1953 | Barkalow | 310—74 |
| 2,653,481 | 9/1953 | Mathiesen | 310—74 |
| 2,720,602 | 10/1955 | Dolude | 310—74 |
| 2,857,534 | 10/1958 | Beach | 310—74 |
| 3,027,471 | 3/1962 | Burgwin | 310—74 |

FOREIGN PATENTS

| | |
|---|---|
| 251,389 | Great Britain. |
| 2,120 | Great Britain. |

OTHER REFERENCES

Fortune magazine, p. 17, January 1951.

J. D. MILLER, *Primary Examiner.*

U.S. Cl. X.R.

310—178, 52, 66, 165; 318—161